United States Patent
Thomas et al.

(10) Patent No.: US 6,822,565 B2
(45) Date of Patent: *Nov. 23, 2004

(54) WIRELESS GAUGE ALERT

(76) Inventors: Keith A. Thomas, 1509 W. 20th Park Pl., Emporia, KS (US) 66801; Timothy A. Kearns, 951 Whildin, Emporia, KS (US) 66801; Bruce R. Davis, P.O. Box 284, 519 W. Lincoln, Madison, KS (US) 66860

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/357,448

(22) Filed: Jul. 20, 1999

(65) Prior Publication Data

US 2001/0045892 A1 Nov. 29, 2001

(51) Int. Cl.[7] .......................... H04Q 7/00; G08B 21/00
(52) U.S. Cl. ............................. 340/539.1; 340/539.14; 340/539.26; 340/612; 340/618; 340/623; 340/870.16; 33/501.6; 73/307; 116/309
(58) Field of Search .................... 340/539, 612, 340/601, 531, 870.11, 870.16, 539.1, 539.14, 539.21, 539.17, 613, 614, 618, 623, 625; 379/37, 38, 40; 11/11; 33/501, 501.6; 73/861.02, 728, 290 R, 293, 307, 308, 700, 1.57, 1.73, 723, 305, 313; 116/309, 328

(56) References Cited

U.S. PATENT DOCUMENTS

| | | | | |
|---|---|---|---|---|
| 4,092,643 A | * | 5/1978 | Stolarczyk | 340/539 |
| 4,153,881 A | * | 5/1979 | Permut et al. | 340/539 |
| 4,459,584 A | * | 7/1984 | Clarkson | 340/539 |
| 4,523,184 A | * | 6/1985 | Abel | 340/539 |
| 4,845,486 A | * | 7/1989 | Knight et al. | 340/618 |
| 5,023,806 A | | 6/1991 | Patel | 340/625 |
| 5,200,735 A | * | 4/1993 | Hines | 340/539 |
| 5,265,032 A | * | 11/1993 | Patel | 379/106 |
| 5,381,136 A | * | 1/1995 | Powers et al. | 340/539 |
| 5,444,433 A | * | 8/1995 | Gropper | 340/601 |
| 5,595,342 A | * | 1/1997 | McNair et al. | 340/539 |
| 5,619,560 A | * | 4/1997 | Shea | 340/623 |
| 5,708,424 A | * | 1/1998 | Orlando et al. | 340/618 |

* cited by examiner

Primary Examiner—Donnie L. Crosland
(74) Attorney, Agent, or Firm—Shook, Hardy & Bacon, L.L.P.

(57) ABSTRACT

A wireless gauge alert system including a near empty sensor, a near full sensor, a transmitter, a receiver, and an alert device used to monitor the fuel level status of a liquid fuel or pressure (vessel) tank having a measuring device with an output member and gauge. Upon detection of a predetermined near empty condition, the transmitter sends an encoded wireless alarm signal to the receiver. The alert device then generates a user notification signal. The receiver and alert device, which preferably comprise an LED, are held in a housing having a plug extending therefrom to mount the housing to an electrical socket in a high traffic area. An alternate alert system includes a receiver unit coupled with a computer that allows either the user or a vendor computer to monitor the status of the sensor and respond accordingly. Another alternate alert system includes multiple zone remote assemblies for installation on separate fuel tanks to be monitored. The wireless alarm signals sent by the remote assemblies are encoded to identify which zone the signal came from and which sensor in the zone detected the predetermined alert condition.

28 Claims, 4 Drawing Sheets

WIRELESS GAUGE ALERT

BACKGROUND OF THE INVENTION

1. Field of the Invention

The present invention is related to apparatus monitoring systems and, more particularly, to gauge alert systems for monitoring apparatuses and notifying responsible individuals of the occurrence of predetermined alert conditions in the apparatuses.

2. Description of the Related Art

Large liquid fuel tanks, such as propane tanks (or more generally pressure vessels), typically include a measuring device and a gauge, so that operators can monitor the fuel level in the tank during operation and filling. The gauge can be, for example, a pressure gauge or a fluid level gauge. As large liquid fuel tanks are filled, it is common for the operator to perform other tasks or become otherwise distracted because of the relatively long period of time it takes such a tank to fill. If the operator over fills the tank, safe pressure limits can be exceeded. Further, the fuel supplies in these tanks last for long periods of time on the order of thirty or more days. Thus, there is a tendency for operators to forget to check the gauges thereby allowing the fuel tanks to be emptied.

SUMMARY OF THE INVENTION

The present invention solves the problems mentioned above and provides a distinct advance in the state of the art. In particular, the invention is directed to a gauge alert system with an output device, a sensor, a transmitter, a receiver, and an alert device. Upon occurrence of a predetermined alarm condition, the transmitter sends a signal to the receiver which in turn sends an alert activation signal to the alert device. When the alert device receives the signal, the alert device generates a user notification signal. Preferably, the gauge alert system is wireless, and the alarm signal comprises a wireless alarm signal.

In a preferred wireless gauge alert system, the output device is a fuel level detector for a liquid fuel tank. The output device includes a magnetic output member, and the sensor is a magnetic sensor operatively positioned relative to other output member to detect an output corresponding to the predetermined alert condition. Preferably, two sensors are provided with one sensor detecting a near empty status, and the other sensor detecting a near full status. So that the responsible individual knows which sensor has been activated, the wireless alarm signal sent by the transmitter is preferably encoded with a selected one of a plurality of codes corresponding to the activated sensor. Alternatively, the output device includes a variable resistance gauge, with a sensor detecting the resistance. The resistance is then converted to the fuel level of the vessel, preferably in terms of a percentage.

In an alternate embodiment, the output device is a fuel pressure sensor, operatively connected with either a magnetic output member or a variable resistance gauge. In this embodiment, the magnetic sensors or variable resistance sensors are set to detect predetermined pressure settings such that the sensors can alert the owner or service personnel of a potential critical failure such as propane relief valves expelling gas when overfilled, pumps running dry, and failure of other devices.

The preferred alert system includes a receiver unit held in a housing having a plug protruding therefrom to mount the receiver unit to an electrical socket in a high traffic area of a home, for example. The alert device preferably comprises a LED, and a reset switch is provided to turn the LED off. Alternatively, the receiver unit is mobile so that it can be mounted on a fuel delivery truck, other vehicle, or be worn on the person of a deliveryman that is responsible for the safe fuel level of the apparatus. The mobility of the alert device is particularly advantageous in construction and mining environments.

The alert system is also incorporated into computer monitoring embodiment. In this alternative, a receiver unit is combined with a personal computer (PC) or any other computer which receives the wireless signals. As incorporated into a home PC, the computer alerts the user of fuel levels and/or alert conditions allowing the user to respond accordingly. Alternatively, as incorporated into a vendor PC, the computer at the vendor's place of business receives fuel level indicators and/or alert condition indicators allowing the vendor to respond accordingly such as automatically scheduling a refilling.

In an alternate wireless gauge alert system, multiple remote assemblies are provided for use in separate zones. Each zone remote assembly includes at least one sensor and a transmitter operable to transmit an encoded wireless alarm signal encoded with the zone from which the signal originated and the sensor which was activated in that zone. A receiver unit receives the wireless signal, and an alert device, preferably having a display, informs a responsible individual of the type of alert condition and the zone in which it occurred. For some applications, the alert device preferably comprises an auto dialer.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 5:
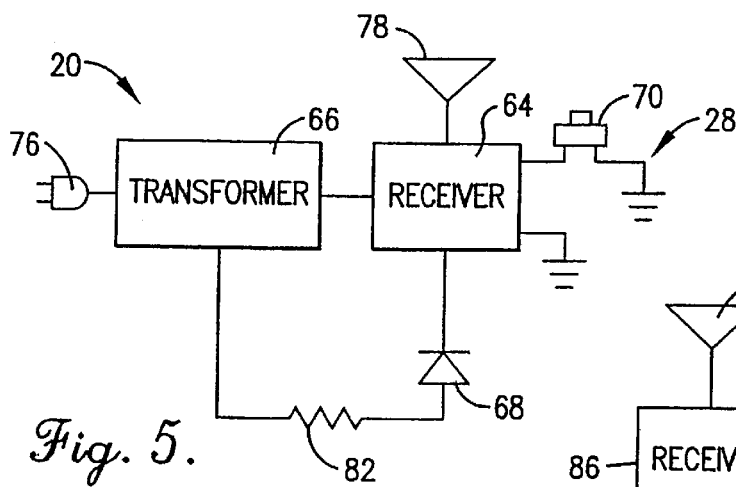
FIG. 5 is a schematic diagram of the receiver unit of FIG. 4.

FIGS. 3 and 5 illustrate a preferred wireless gauge alert system 20 in accordance with the present invention. The gauge alert system 20 will be described, by way of example, in connection with an apparatus being monitored. Specifically, the apparatus is a liquid fuel tank 22 (FIG. 1) having a measuring device 24 (FIG. 2). The gauge alert system 20 includes a remote assembly 26 and a receiver unit 28.

Figure 1:
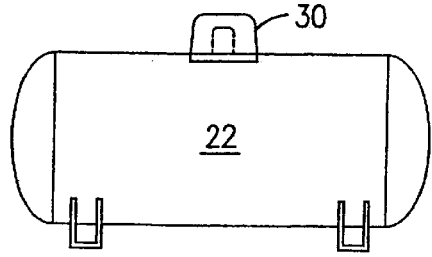
FIG. 1 is a schematic side view of a liquid fuel tank utilizing a wireless gauge alert system according to the present invention.
Figure 2:
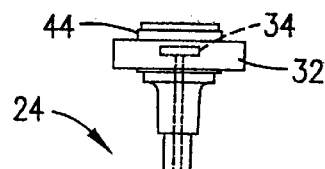
FIG. 2 is a schematic side view of a measuring device used to monitor the fuel level status in the liquid fuel tank of FIG. 1.

Referring to FIG. 1, the liquid fuel tank 22 and measuring device 24 are generally conventional and will be described to the extent needed to gain an understanding of the invention. The liquid fuel tank 22 includes an internal fuel chamber and an upper housing 30 which covers the measuring device 24 and the remote assembly 26.

Referring to FIG. 2, the measuring device 24, preferably a fuel level detector, has a mounting base 32, output member 34, linkage arm assembly 36, lever arm 38, buoy 40, and counter balance 42. The output member 34 is movably held in the mounting base 32 and is connected to the lever arm 38 by the linkage arm assembly 36. The buoy 40 and counter balance 42 are positioned at opposite ends of the lever arm 38, and the lever arm 38 is movably positioned inside the internal fuel chamber of the tank 22. As the buoy 40 is moved up and down with the fuel level in the tank 22 to detect the full level in the tank 22, the output member 34 is moved by the linkage assembly 36. The output member 34 preferably comprises a magnet.

As would be understood, alternate output monitors 34 or measuring devices 24 could be used with the present invention. One such potential alternate measuring device 24 is a pressure gauge. In this alternative, the pressure gauge is generally conventional and requires a needle display layout. As would be understood, the pressure gauge monitors alert conditions relating to the fuel pressure within apparatus 22.

Figure 3A:
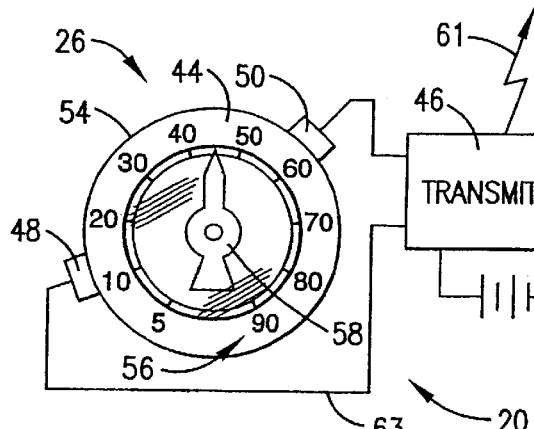
FIG. 3a is a schematic diagram of a remote assembly of the wireless gauge alert system.

Referring to FIG. 3*a*, the preferred remote assembly 26 includes a gauge 44, a 900 MHz transmitter 46, sensors 48, 50, and a power source 52. The gauge 44 is generally conventional and will be described to the extent needed to gain an understanding of the invention. The gauge 44 comprises a circular dial gauge having a circumference 54, a circularly arranged graduation of numbers 56, and a needle indicator 58. The gauge 44 is mounted in the mounting base 32 of the measuring device 24, and the needle indicator 58, which is rotatably mounted on the gauge, is preferably magnetic, so that the rotational position of the needle changes as the rotational position of the magnetic output member 34 changes to provide a gauge reading.

With continued reference to FIG. 3*a*, the transmitter 46 preferably comprises a transceiver having Part No. LSDR 60 from World Wireless Corporation in Salt Lake City, Utah. The transmitter is provided with a stub antenna 60, and the transmitter 46 is operable to transmit a wireless alarm signal 61 to the receiving unit 28. An analog to digital converter (not shown) and a microprocessor (not shown) are also provided in the system. The converter receives analog data from the gauge and converts it to digital data. The digital data is introduced to the microprocessor which gives the transmitter the signal to be sent.

Figure 8:
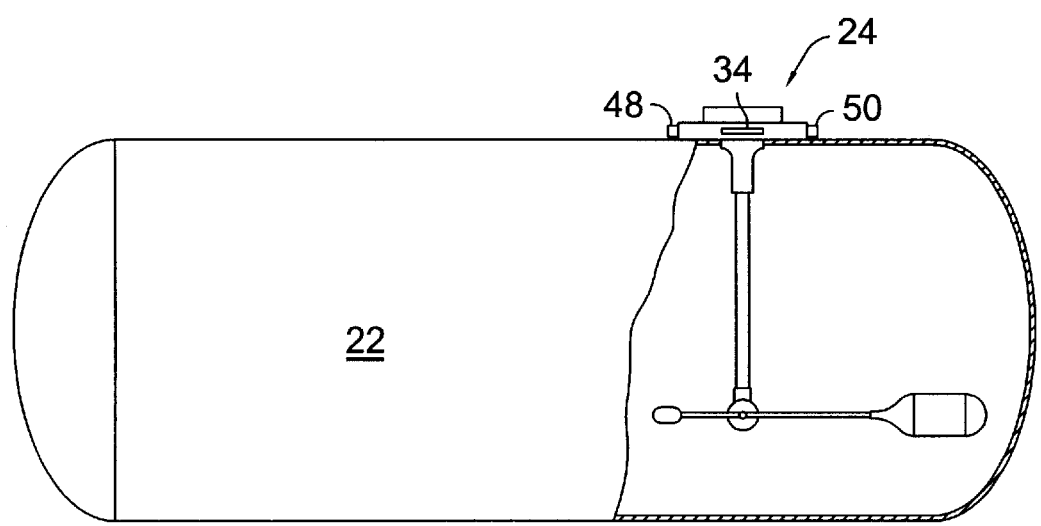
FIG. 8 is a schematic cut-away view of a liquid fuel tank illustrating a dial gauge, output member and sensor, wherein the sensor is positioned externally to the gauge assembly in accordance with the present invention.

The sensors 48, 50 comprise a near empty sensor 48 and a near full sensor 50 both operatively positioned relative to the gauge 44 and the output member 34. The near empty sensor 48 is attached to the gauge 44 on its circumference 54, so that it is adjacent to the needle 58 and the output member 34. The empty sensor is positioned at a location on the circumference corresponding to a lower portion of the graduation of numbers 56 and a gauge reading representing a predetermined alert condition of the fuel level status of the fuel tank 22. The near full second sensor 50 is also attached to the gauge 44 on its circumference 54 so that it is adjacent to the needle 58 and the output member 34. The full sensor is positioned at a location on the circumference corresponding to an upper potion of the graduation of numbers 56 and a gauge reading representing a second predetermined alert condition of the fuel level status of the fuel tank 22. The sensors can detect and be activated by either the needle 58 or the output member 34, but the sensors are preferably magnetic and are activated by the output member 34. An illustration of liquid fuel tank 22 with a measuring device 24 and a gauge 44 having the sensors 48 and 50 positioned on the circumference is shown in FIG. 8.

The empty and full sensors are operable to transmit first and second alert signals, respectively, over sensor wires 63, and the transmitter 46 is operably coupled with the sensors to receive the alert signals. The alert signals can be encoded with a selected one of a plurality of codes corresponding to the different sensors. If encoded alert signals are used, the wireless alarm signal 61 would also be encoded.

The power source 52 provides power to the transmitter and preferably comprises a battery. Alternatively, the power source can comprise a transformer for converting power from an electrical outlet. Further, the remote assembly can be stationary or mobile. For example, the fuel level type gauge could be used on fertilizer tanks being towed by a tractor.

Figure 3B:
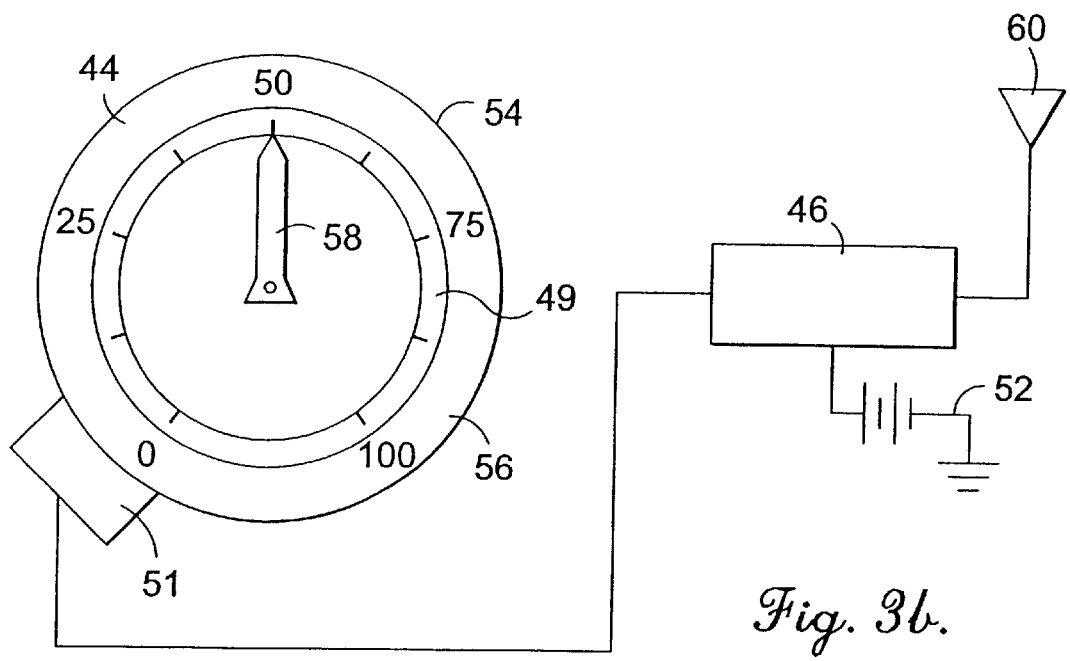
FIG. 3b is a schematic diagram of a remote assembly utilizing a variable resistance sensing gauge.

With reference to FIG. 3*b*, in an alternate embodiment, the remote assembly 26 includes a gauge 44, or transmitter 46, needle 58, antenna 60, power source 52, rheostat 49 and resistance sensor 51. Similar to the other embodiment, the gauge 44 has a generally circular circumference 54, a circular graduation of numbers 56 and a needle 58. The needle path is defined by movement along rheostat 49. As the needle 58 rotates, sensor 51 detects a change in resistance, which can generally be translated into a value, and passed along to the transmitter 46.

Figure 4:
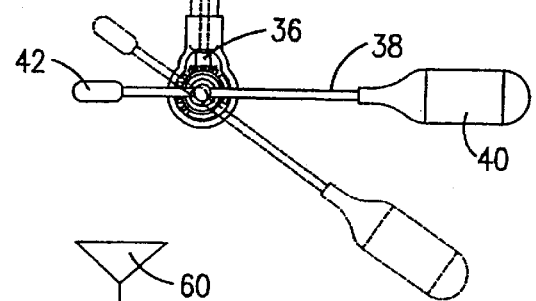
FIG. 4 is a schematic perspective view of a receiver unit of the wireless gauge alert system.
Figure 4:
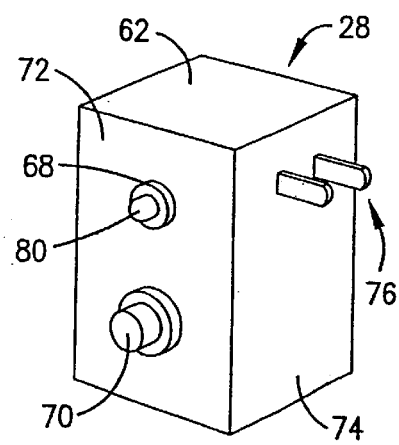

Referring to FIGS. 4 and 5, the receiver unit 28 includes a housing 62 holding a receiver 64, a transformer 66, an alert device 68, and a reset switch 70. The receiver can also be provided in the form of a pager or other mobile unit. The housing 62 is configured to mount on a wall and includes a control face 72 mounting the alert device 68 and the reset switch 70. The housing also includes a mounting face 74 from which a plug 76 protrudes. The plug 76 is configured to mate with an electrical socket thereby mounting the housing on the wall or other structure supporting the electrical socket.

The receiver 64 is mounted inside the housing 62 and preferably includes an antenna 78. The receiver 64 is also preferably a 900 MHz transceiver from World Wireless Corporation in Salt Lake City, Utah, having Part No. LSDR 60. The receiver is operable to receive the wireless alarm signal 61 from the transmitter 46 and to send an alert activation signal to the alert device 68. The alert activation signal can also be encoded. Using transceivers in both the remote assembly and receiver unit allows the receiver unit to send a status request signal to the remote assembly. The remote assembly then takes a reading, such as when a pressure gauge is used, and transmits a status signal back to the receiver unit. Alternatively, the microprocessor can be programmed to send the status signal at desired intervals in the fuel level. The position of the needle is determined by an analog signal, generated for example by a transducer, representative of the pressure reading.

The transformer 66 is mounted in the housing 62 and is in operative communication with the plug 76 to receive power from an electrical socket through the plug. The transformer converts the power from the electrical socket to three (3) volts DC for use by the receiver and alert device. The transformer 66 is in electrical communication with the receiver 66 and the alert device 68, so that the receiver 66 and alert device 68 are powered by the transformer. Alternatively, a battery could be used to power the receiver and the alert device.

The alert device 68 comprises a LED light 80 having a resistor 82 interposed between the light and the transformer 66. The alert device 68 is operable to transmit a user notification signal which preferably comprises illumination of the light 80. The alert device 68 is also capable of sending a coded message. For example, if the empty sensor is activated, the light 80 is continuously illuminated, but if the full sensor is activated, the light 80 blinks, flashing on and off. The light 80 is positioned on the control face 72 of the housing 62.

The reset switch 70 is a button switch positioned on the control face 72 of the housing 62. The reset switch 70 is operatively connected to the alert device 68, so that depressing the button of the reset switch deactivates the alert device 68 and terminates the use notification signal.

Figure 6A:
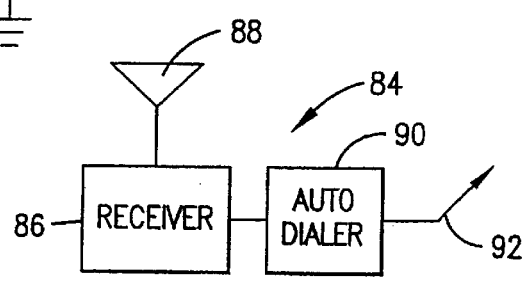
FIG. 6a is a schematic diagram of an alternate receiver unit of the wireless gauge alert system.

Referring to FIG. 6a, an alternate receiver unit 84 includes a receiver 86 and antenna 88 and an auto dialer device 90. The auto dialer sends a user notification signal, which can be encoded, to a remote individual through a phone line 92.

Figure 6B:
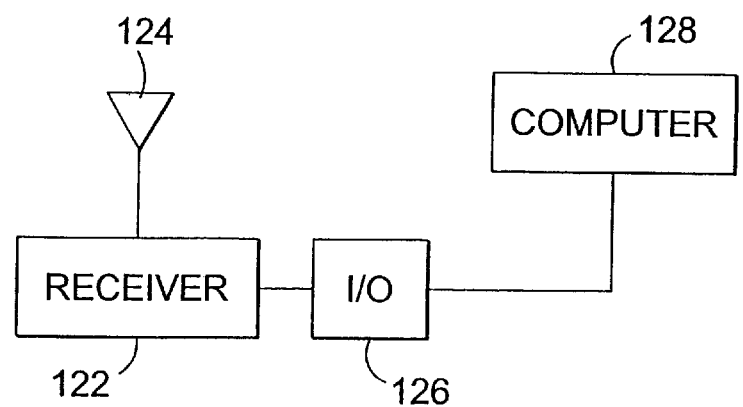
FIG. 6b is a schematic diagram of an alternate receiver unit of the wireless gauge alert system.

Referring to FIG. 6b, another alternative receiver unit 120 is incorporated into a computer terminal configuration. The computer receiver 120 includes a receiver 122, an antenna 124, and an input/output 126. The receiver unit 124 is coupled to a computer 128 via input/output 126. The unit 120 receives incoming signals from output device 34 and relays it to a computer 128.

Figure 7:
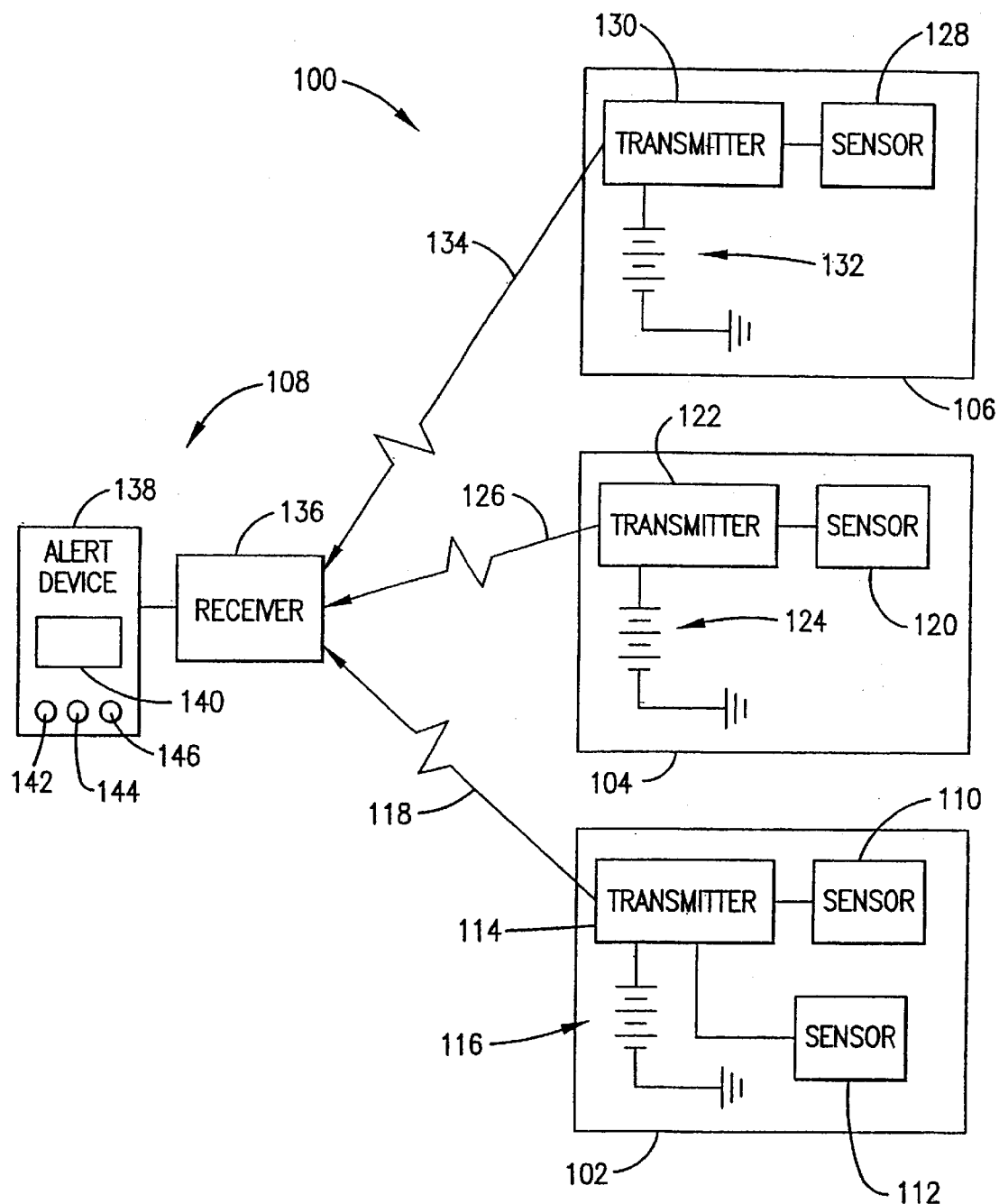
FIG. 7 is a schematic diagram of an alternate wireless gauge alert system having multiple zones.

Referring to FIG. 7, an alternate embodiment of the wireless gauge alert system 100 includes multiple zone remote assemblies 102, 104, 106 and a receiver unit 108. The zone one remote assembly 102 includes two zone one sensors 110, 112, a zone one transmitter 114, and a zone one power source 116 similar to the remote assembly 26 shown in FIG. 3. The zone one transmitter 114 is operable to transmit a zone one encoded wireless alarm signal 118 to the receiver unit 108. The wireless alarm signal is encoded with the zone of occurrence of the predetermined alert condition and which sensor, the near empty 110 or the near full 112, detected the alarm condition.

The zone two remote assembly 104 includes a near empty zone two sensor 120, a zone two transmitter 122, and a zone two power source 124. The zone two transmitter 122 is operable to transmit a zone two encoded wireless alarm signal 126 to the receiver unit 108. Similarly, the zone three remote assembly 106 includes a near empty zone three sensor 128, a zone three transmitter 130, and a zone three power source 132. The zone three transmitter 130 is operable to transmit a zone three encoded wireless alarm signal 134 to the receiver unit 108. The zone transmitter again preferably comprises a transceiver.

The receiver unit 108 includes a receiver 136, preferably a transceiver, and an alert device 138. The receiver 136 is operable to receive the zone wireless alarm signals 118, 126, 134 and send an encoded alert activation signal to the alert device 138. The alert device 138 is operable to receive the alert activation signal and generate a user notification signal. Preferably, the alert device comprises a display 140 which informs the user of the zone in which the alert condition occurred and the type of alert condition, specifically, near empty or near full. The receiver unit 108 also includes a microprocessor (not shown) and an encoder (not shown) to operate the display 140. If the pressure gauge with a magnetized needle is used, the display can provide a fuel level of the desired zone in terms of a percentage. By pressing the zone, one status inquiry switch 142, a zone one status request signal is sent to the zone one transceiver. The zone one sensor 160 takes a reading, and the zone one transceiver sends a status signal box to the receiver unit 108 transceiver 136. The microprocessor decodes the signal and sends the digital data to the encoder which lights the appropriate LED segments in the display to display the fuel level, in percentage, in the zone one tank. Depressing the zone two status inquiry switch 144 and/or the zone three status inquiry switch 146 operates similarly to the zone one switch 142 to determine the fuel level in zones two and three, respectively.

In operation and referring initially to FIGS. 1–3, as the fuel level in tank 22 fills towards empty, the buoy 40 lowers changing the rotational positions of the output member 34 and the needle indicator 58 which both operate as output devices providing outputs corresponding to the predetermined alert condition. When the status of the fuel level reaches a predetermined level near empty, the near empty sensor 48 detects the output corresponding to that level, closes a contact, and sends the alert signal to the transmitter 46. Upon receiving the alert signal from the sensor 48, the transmitter sends the encoded wireless alarm signal 61 to the receiver unit 28. The selected code contained in the wireless alarm signal corresponds to the near empty sensor 48.

Referring to FIGS. 4 and 5, the receiver 64 of the receiver unit 28 receives the wireless alarm signal 61 and sends the alert activation signal to the alert device 68. The alert device then transmits the user notification signal. For the near empty sensor 48, the LED 80 is activated and stays lighted until the reset switch 70 is depressed. When the remote responsible individual sees the notification signal, the reset switch is depressed, and the responsible individual knows that the fuel tank 22 needs to be filled thereby reducing the chances of the fuel tank 22 being completely drained.

To make the receiver unit and its alert device readily visible, it can be plugged into any household electrical socket. A preferred socket would be located in a high traffic area such as a kitchen or hallway.

While the responsible individual is filling the fuel tank 22, the buoy 40 rises changing the rotational positions of the output member 34 and the needle indicator 58. When the status of the fuel level reaches a predetermined level near full, the full sensor 50 closes a contact and sends the alert signal to the transmitter 46. Upon receiving the alert signal from the sensor 50, the transmitter sends the encoded wireless alarm signal 61 to the receiver 64 which receives the wireless alarm signal 61 and sends the alert activation signal to the alert device 68. The alert device then transmits the user notification signal. For the near full sensor 50, the LED 80 is activated and blinks until the reset switch 70 is depressed. When the responsible individual sees the notification signal, the reset switch is depressed, and the responsible individual knows that the fuel tank 22 is almost full and that the gauge needs to be watched directly until the task is completed. Thus, the present invention reduces the occurrences of over filled and pressurized fuel tanks. To assure notification of the person filling the tank, the receiver unit can be provided in the form of a portable and battery powered pager which provides a beeping or vibrating user notification signal.

If the alternate receiver unit 84 of FIG. 6a is used, the receiver 86 sends the alert activation signal to the auto dialer 90, and the auto dial 90 sends the user notification signal across the phone line 92. Thus, a fuel tank owner can contract with another person to fill the tank when needed, and the responsible person does not have to make extra trips to check the fuel level in the tank.

With reference to FIG. 6b, there are two embodiments which implement the computer alternative. As applied to use within a user's PC, the computer 128 can maintain a display of fluid levels and/or broadcast alerts for full or empty readings. Additionally, the computer 128 could be programmed to communicate with one or more other computers if an alert situation is detected. As applied to use within a vendor PC, the computer 128 monitors the alert receiver's 120 status and appropriately schedules a service visit if a low fuel situation is received.

The operation of the wireless alert system 100 shown in FIG. 7 is similar to the operation of the wireless alert system of FIGS. 3–6 but is especially useful to an entity responsible for monitoring the fuel level status of many fuel tanks. Each zone remote assembly 102–106 is installed on a different fuel tank having an output device. For example, the zone one tank has a zone one output device providing a zone one output. The fuel tanks can be at the same facility or they can be spread out among remote locations such as farm houses, for example. If the tanks are spread out among different locations, the auto dialer receiver unit 84 is preferably used.

When, for example, the zone two sensor 120 detects the predetermined near empty condition of the fuel tank, the sensor 120 sends the alert signal to the zone two transmitter 122. The transmitter 122 sends the encoded wireless alarm signal 126 which includes a selected one of a plurality of codes corresponding to zone two. The receiver 136 receives the encoded alarm signal 126 and sends the alert activation signal to the alert device 138. The display 140 then provides a message to inform a responsible individual that the fuel tank in zone two is near empty. If multiple sensors are used in a zone, such as zone one, the wireless alarm signal is encoded with an additional code corresponding to the sensor which detected a predetermined alert condition. Thus, many tanks can be monitored without repeated unnecessary trips to check their fuel levels.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An apparatus for monitoring a vessel and transmitting a wireless alarm signal to a remote device capable of generating a user notification signal indicating the occurrence of one or more predetermined alert conditions for a status of the vessel being monitored, wherein the vessel includes an output device adapted for radial movement indicative of the status of the vessel, the apparatus comprising:

a first sensor non-intrusively coupled to the output device of the vessel, wherein the first sensor is operable to detect the occurrence of a first predetermined alert condition as a function of the radial movement of the output device and to transmit an alert signal upon occurrence of the first predetermined alert condition; and a transmitter operatively coupled with the first sensor to receive the alert signal from the first sensor, the transmitter being operable, upon receiving the alert signal, to transmit a wireless alarm signal to the remote device.

2. The apparatus as set forth in claim 1, wherein the status comprises the level of fluid in the vessel.

3. The apparatus as set forth in claim 1, wherein the status comprises the pressure of fluid in the vessel.

4. The apparatus as set forth in claim 1, wherein the output device comprises a magnetic output device.

5. The apparatus as set forth in claim 1, wherein the output device comprises a dial gauge.

6. The apparatus as set forth in claim 1, wherein the sensor comprises a magnetic sensor.

7. The apparatus as set forth in claim 1, further comprising a second sensor non-intrusively coupled to the output device of the vessel, the second sensor being operable to detect a second predetermined alert condition as a function of the radial movement of the output device and to transmit a second alert signal upon occurrence of the second predetermined alert condition.

8. The apparatus as set forth in claim 7, wherein the first sensor is a near empty sensor and the second sensor is a near full sensor.

9. The apparatus as set forth in claim 1, further comprising a second sensor non-intrusively coupled to a second output device of a second vessel being monitored, the second sensor being operable to detect a second predetermined alert condition as a function of the radial movement of the second output device and to transmit a second alert signal upon occurrence of the second predetermined alert condition.

10. The apparatus as set forth in claim 9, wherein the vessel and the second vessel are in distinct zones so that the first sensor is a zone one sensor and the second sensor is a zone two sensor.

11. The apparatus as set forth in claim 7, wherein the alarm signal comprises an encoded wireless alarm signal including a selected one of a plurality of codes corresponding to the first alert signal and the second alert signal.

12. The apparatus as set forth in claim 1, wherein the output device is a variable resistance gauge.

13. The apparatus as set forth in claim 1, wherein the output device is a pressure gauge.

14. An apparatus for monitoring a vessel and transmitting a wireless alarm signal to a remote device capable of generating a user notification signal indicating the occurrence of a predetermined alert condition for a status of the vessel being monitored, wherein the vessel includes an output device adapted for radial movement indicative of the status of the vessel, the apparatus comprising:

means for detecting the occurrence of the predetermined alert condition as a function of the radial movement of the output device and for transmitting an alert signal upon occurrence of the predetermined alert condition; and a transmitter operatively coupled with the sensor to receive the alert signal from the sensor, the transmitter being operable, upon receiving the alert signal, to transmit a wireless alarm signal to the remote device.

15. A method for monitoring a vessel and transmitting a wireless alarm signal to a remote device capable of generating a user notification signal indicating the occurrence of a predetermined alert condition for a status of the vessel being monitored, wherein the vessel includes an output device adapted for radial movement indicative of the status of the vessel, the method comprising:

detecting, by a sensor non-intrusively coupled to the output device of the vessel, the occurrence of the predetermined alert condition as a function of the radial movement of the output device;

transmitting, by the sensor, an alert signal upon occurrence of the predetermined alert condition; and receiving the alert signal from the sensor at a transmitter; and upon receiving the alert signal, transmitting a wireless alarm signal to the remote device.

16. A system for monitoring a vessel and transmitting a wireless alarm signal to generate a user notification signal indicating the occurrence of a predetermined alert condition for a status of the vessel being monitored, wherein the vessel includes an output device adapted for radial movement indicative of the status of the vessel, the system comprising:

a sensor non-intrusively coupled to the output device of the vessel, wherein the sensor is operable to detect the occurrence of the predetermined alert condition as a function of the radial movement of the output device and to transmit an alert signal upon occurrence of the predetermined alert condition;

a transmitter operatively coupled with the sensor to receive the alert signal from the sensor, the transmitter being operable, upon receiving the alert signal, to transmit a wireless alarm signal to the remote device;

a receiver operable to receive the alarm signal, wherein the receiver is operable to transmit an alert activation signal upon receiving the alarm signal; and an alert device coupled with the receiver, wherein the alert device is operable to receive the alert activation signal, and the alert device is operable to generate a user notification signal upon receiving the alert activation signal.

17. An apparatus for monitoring a vessel and transmitting a wireless signal to a remote device indicating a status of the vessel being monitored, wherein the vessel includes an output device adapted for radial movement indicative of the status of the vessel, the apparatus comprising:

one or more sensors non-intrusively coupled to the output device of the vessel, wherein the one or more sensors are operable to detect the status of the vessel as a function of the radial movement of the output device and to transmit an alert signal upon occurrence of at least one predetermined alert condition; and a transmitter operatively coupled with the one or more sensors to receive the alert signal from the one or more sensors, the transmitter being operable, upon receiving the alert signal, to transmit a wireless signal to the remote device.

18. The apparatus as set forth in claim 17, wherein the status comprises the level of fluid in the vessel.

19. The apparatus as set forth in claim 17, wherein the status comprises the pressure of fluid in the vessel.

20. The apparatus as set forth in claim 17, wherein the output device comprises a magnetic output device.

21. The apparatus as set forth in claim 17, wherein the output device comprises a dial gauge.

22. The apparatus as set forth in claim 17, wherein the sensor comprises a magnetic sensor.

23. The apparatus as set forth in claim 17, wherein the output device is a variable resistance gauge.

24. The apparatus as set forth in claim 17, wherein the output device is a pressure gauge.

25. The apparatus as set forth in claim 17, wherein the one or more sensors are operable to detect the status of the vessel utilizing one or more discrete measurements.

26. The apparatus as set forth in claim 17, wherein the one or more sensors are operable to detect the status of the vessel utilizing a plurality of discrete measurements.

27. The apparatus as set forth in claim 17, wherein the one or more sensors are operable to detect the status of the vessel utilizing a continuous spectrum of measurements.

28. A system for monitoring a vessel and transmitting a wireless signal to a remote device indicating a status of the vessel being monitored, wherein the vessel includes an output device adapted for radial movement indicative of the status of the vessel, the system comprising:

one or more sensors non-intrusively coupled to the output device of the vessel, wherein the one or more sensors are operable to detect the status of the vessel as a function of the radial movement of the output device and to transmit an alert signal upon occurrence of at least one predetermined alert condition;

a transmitter operatively coupled with the one or more sensors to receive the alert signal from the one or more sensors, the transmitter being operable, upon receiving the alert signal, to transmit a wireless signal to the remote device;

a receiver operable to receive the alarm signal, wherein the receiver is operable to transmit an alert activation signal upon receiving the alarm signal; and an alert device coupled with the receiver, wherein the alert device is operable to receive the alert activation signal, and the alert device is operable to generate a user notification signal upon receiving the alert activation signal.

* * * * *